United States Patent [19]

Stevenson

[11] 4,034,930
[45] July 12, 1977

[54] SPOOL HOLDING DEVICE

[76] Inventor: Curtis A. Stevenson, 3722 East Pasadena, Phoenix, Ariz. 85018

[21] Appl. No.: 667,576

[22] Filed: Mar. 17, 1976

[51] Int. Cl.² .................. B65H 17/52; B65H 49/00
[52] U.S. Cl. .......................... 242/106; 242/129.5; 242/129.8
[58] Field of Search .......... 242/106, 129.5, 129.8, 242/134, 136; 43/25–25.2

[56] References Cited

U.S. PATENT DOCUMENTS

| 417,151 | 12/1889 | Cooney | 242/136 |
| 1,511,005 | 10/1924 | Powers | 242/136 |
| 2,899,148 | 8/1959 | Brainard | 242/129.8 |
| 3,402,501 | 9/1968 | Davis | 43/25.2 |

Primary Examiner—Leonard D. Christian
Attorney, Agent, or Firm—Cahill, Sutton & Thomas

[57] ABSTRACT

A device for holding a spool of line on a fishing rod to allow the line to be wound from the spool onto a fishing reel. The device includes a clasping member for releasably securely fastening the device to the rod shaft and a pair of arms springably urged in lateral opposing directions, the arms being pressed together and inserted through the aperture of the spool and then released, allowing the spring action to force the arms against the interior walls of the aperture to hold the spool on the arms at a location opposing the fishing reel.

7 Claims, 5 Drawing Figures

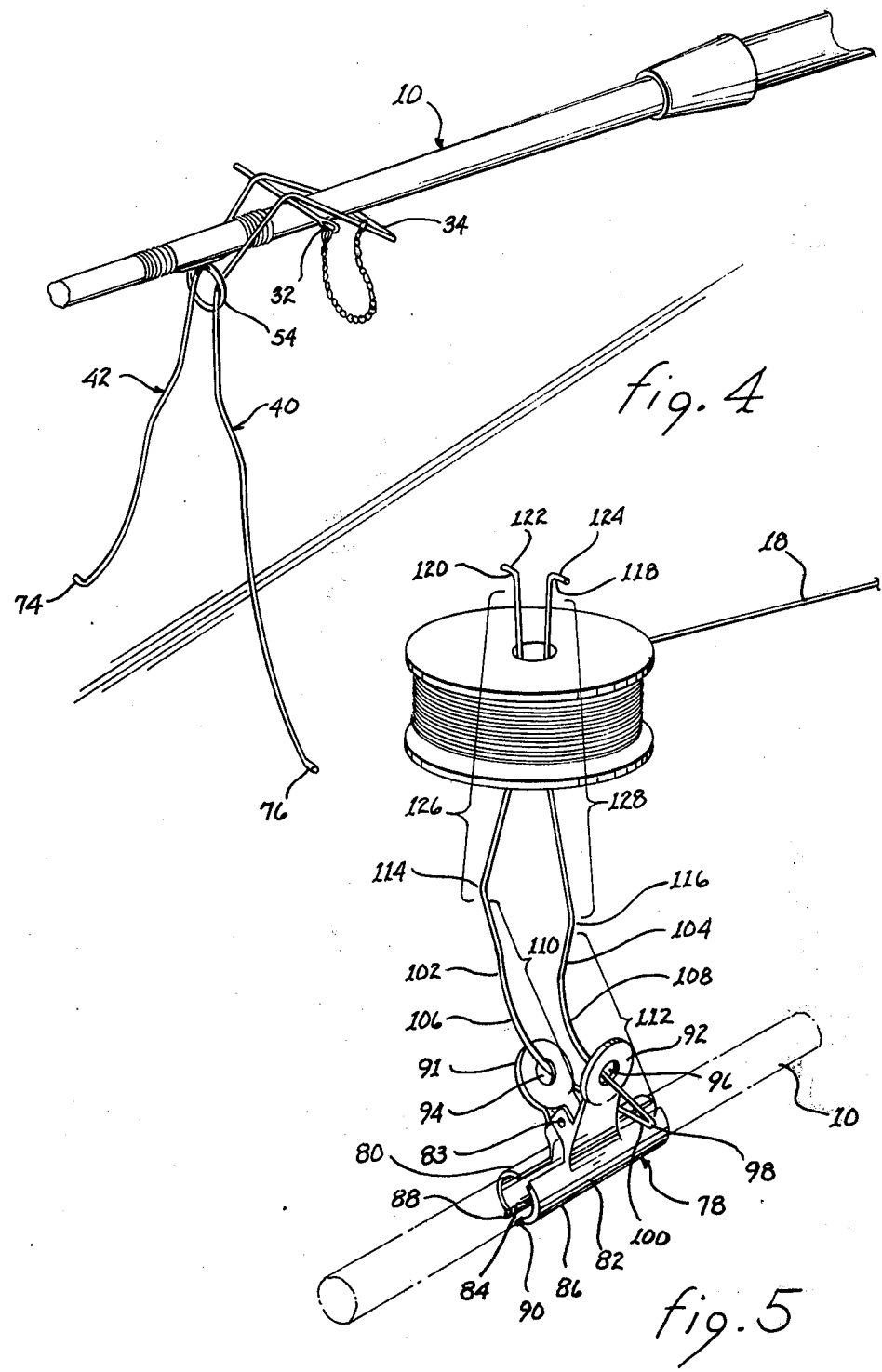

SPOOL HOLDING DEVICE

This invention relates to a device for assisting in the winding of line from a spool onto a fishing reel.

The task of winding line onto a fishing reel, while seemingly simple to the casual onlooker, is an operation fraught with frustrations. Line is provided on package spools having a central aperture. The free end of the line on the package spool is attached to the spool of the reel and then the line reeled onto the fishing spool which is attached to the reel. Of course, in the process of reeling the line onto the reel spool, the package spool turns as the line is payed off. Unless the package spool is held in a fixed position except for rotation, the spool will roll around with the inevitable result that the line is tangled prior to being received by the reel spool or twisted as it is wound on the spool. See U.S. Pat. No. 3,026,059. A commonly employed method of loading a reel is to insert a pencil through the aperture of the spool and hold the protruding ends of the pencil in some way so that the pencil serves as an axis about which the spool rotates as unwinding occurs. This is unsatisfactory, however, because the package spool moves about on the pencil and the line generally sags in take-off so that tangles, or twists, or other problems occur. If two people are available, one to hold the package spool and one to reel, some, but not all, of the problems, are avoided.

In addition to the problem of tangling, kinking, and twisting, the use of a pencil or the like does not afford the necessary tension on the line as it is wound on the reel spool, resulting in an uneven wind. Several devices have been designed to overcome the above-mentioned difficulties. See, e.g., U.S. Pat. No. 3,776,485. Sporting goods shops have special spool winding machines but these are too expensive for the average individual. U.S. Pat. No. 3,026,059 describes a reel loading device which is mounted on the rod, but this device appears to involve relatively sophisticated mechanisms. What is needed is a simple, inexpensive, individually manually operable device for assisting in the loading of a reel. These are the objects of this invention.

These objects are attained in the present invention by a device adapted to hold an apertured spool of line on a rod for reeling of said line from said spool onto a reel positioned on said rod, said device comprising rod attaching means for releasably attaching said device to a rod; and first and second arms operatively associated with said attaching means, said first and second arms each having a spring tension urging said arms in opposing directions, said spring tension being of a magnitude sufficient to be overcome manually to bring said arms into close spaced relationship to pass through said aperture of said spool whereupon release of said arms causes said arms to separate thereby exerting a holding force due to said spring tension on said spool sufficient to allow line to be withdrawn from said spool under tension onto said reel.

Preferred embodiments of the present invention are illustrated in the attached drawings, wherein:

FIG. 4 is a perspective view of the embodiment of FIG. 1 illustrating its use as a rod support; and FIG. 5 is a perspective view of a second embodiment of the invention.

Figure 1:
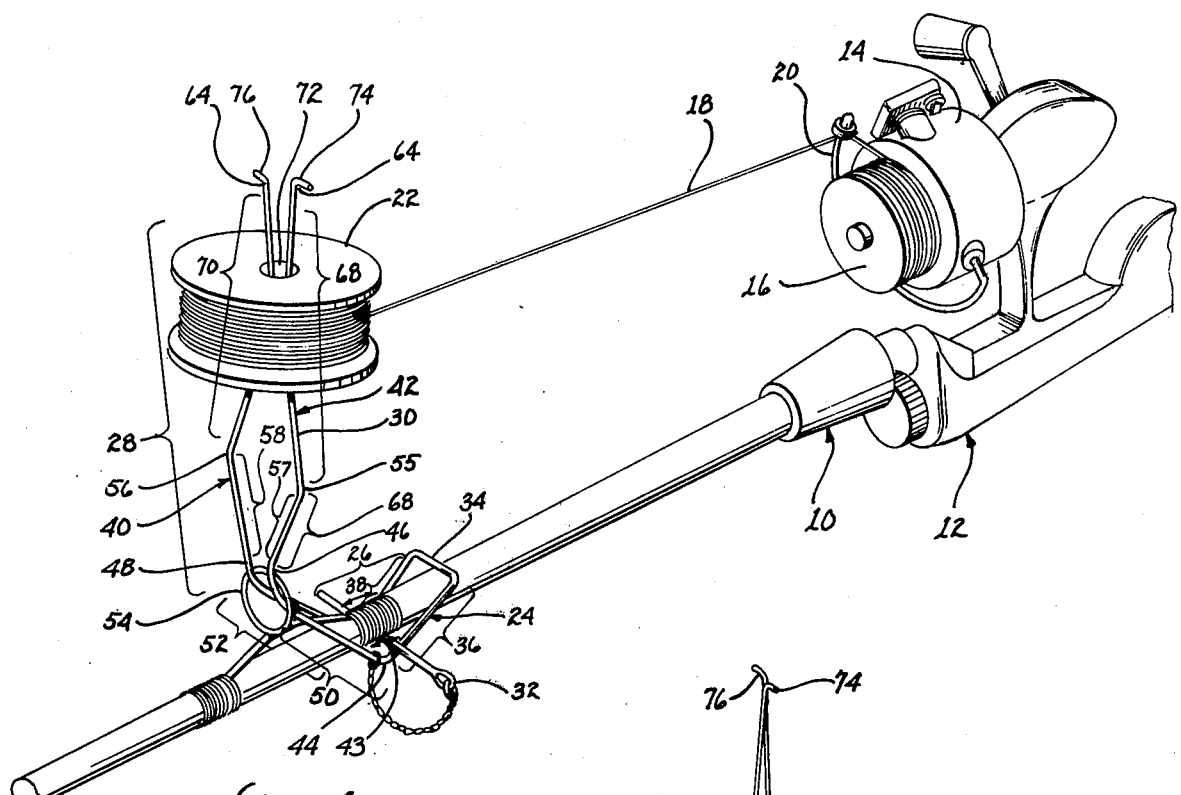
FIG. 1 is a perspective view of an embodiment of the invention holding a spool in place on a fishing rod for reel loading.

Referring to FIG 1, there is illustrated a fishing rod 10 having a reel seat 12 on which is mounted a conventional open-face spinning reel 14 having a reel spool 16. In FIG. 1, reel spool 16 is shown as partially loaded with line 18 which extends from spool 16 past bail guide 20. Forward of reel 14 is a package spool 22 holding a supply of line 18. Package spool 22 is held in opposing relationship to reel spool 16 by the device of the invention, spool holder 24. The spool holder 24 includes a rod attaching section generally designated by the numeral 26 and a spool holding section generally designated by the numeral 28.

Figure 3:
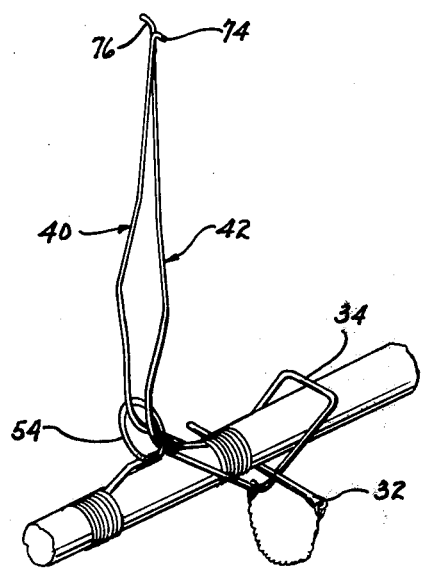
FIG. 3 is a perspective view of the embodiment depicted in FIG. 1 illustrating attachment of the device to the fishing rod.

The embodiment of FIG. 1 is composed of a single piece of spring steel (music) wire 30 bent as hereinafter described to form the rod attaching section 26 and spool holding section 28, plus a retaining member 32. Rod attaching section 26 includes a junction member 34 from opposing ends of which segments 36 of arms 40 and 42 extend in parallel spaced relationship to one another. At the same distance from junction member 34, arms 40 and 42 each make a bend to form equal angles 43. Arms 40 and 42 extend in parallel, spaced relationship from apexes 44 of angles 43 to points 46 and 48, respectively, forming segments 50 and 52, respectively. Segments 50 and 52 pass through line guide 54. The diameter of guide 54 is less than the longitudinal dimension of junction member 34 and, accordingly, segments 50 and 52 are under lateral restraint within guide 54. Thus, segments 50 and 52 press against the adjacent walls of guide 54 due to the inherent spring in arms 40 and 42. This serves to maintain the position of the spool holder 24 as shown in FIG. 1. From points 46 and 48, arms 40 and 42 diverge at equal angles to points 55 and 56, forming segments 57 and 58, respectively. From points 55 and 56 arms 40 and 42 extend to points 64 and 66 forming segments 68 and 70. It is along segments 68 and 70 that package spool 22 is located. Arms 40 and 42 pass through aperture 72 of the spool 22. Aperture 72 is of such a size relative to the configuration and spring characteristics of arms 40 and 42 that segments 68 and 70 are restrained by the walls forming aperture 72. Thus, segments 68 and 70 press against the walls of aperture 72, to hold the spool 22 in place. Moreover, as is apparent from FIG. 1, the aperture 72 is of a size that segments 68 and 70 are spaced further apart both before and after the confines of aperture 72. The bulges provided by the increased spacing between segments 68 and 70 above and below aperture 72 serve to maintain spool 22 in position. At points 64 and 66, arms 40 and 42 diverge sharply away from each other to form feet 74 and 76, respectively. The latter serve as stops which may engage the outer edge of the aperture 72 of spool 22 to further insure an effective grip on spool 22. Another primary function of feet 74 and 76 is to provide a means for holding the ends of arms 40 and 42 temporarily in a crossed or scissored manner while the spool holder is being attached to the rod, as shown in FIGS. 2 and 3 and hereinafter explained.

Figure 2:
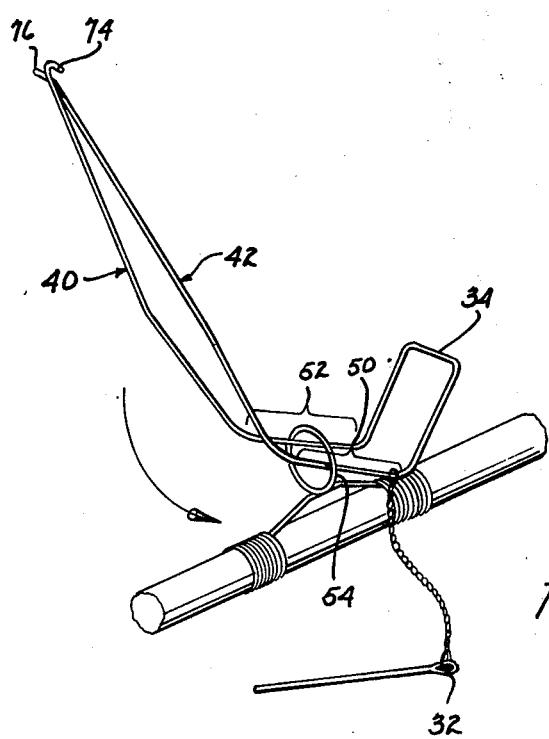
FIG. 2 is a perspective view of the embodiment depicted in FIG. 1 with the invention shown at an intermediate stage of attachment to a fishing rod.

FIG. 2 illustrates a stage in the mounting of the spool holder 22 on the shaft of rod 10. The first step is to pinch arms 40 and 42 together so that one of the arms 40 and 42 crosses over the other arm at a point along segments 68 and 70 and then a reverse crossover occurs at feet 74 and 76. In that way, each arm restrains the other from opening. The spool holder 24 is then passed through the aperture of guide 54, keeping the holder 24 on the same side of the rod as guide 54. After points 46 and 48 pass through guide 54, the section of the holder 24 including angles 43 is pushed downward (as seen in FIG. 2) to the position shown in FIG. 3. When apexes 44 have passed beyond the rod shaft, a sufficient distance for retaining member 32 to be inserted in the space between the rod shaft and apexes 44, the retaining member 32 is inserted. Without some means of retention such as is provided by member 32, the spool holder 24 will snap back to the position shown in FIG. 2. When the spool holder 24 is attached to rod 10, it is seen that the rod attaching section 26 provides a holding space defined as between the junction member 34 and apexes 44. In FIG. 3, junction member 34 contacts the side of rod 10 upon which is situated guide 54 and apexes 44 are aligned below rod 10. The holding space is laterally defined by segments 36 and 38 of arms 40 and 42. After the holder 24 is locked in place as shown in FIG. 3, the arms 40 and 42 can be inserted through the aperture 72 of the package spool 22 until the spool reaches the position shown in FIG. 1. The arms 40 and 42 can then be pinched together at points 55 and 56, thereby disengaging feet 74 and 76 allowing the arms 40 and 42 to spring open to the position shown in FIG. 1. The line on package spool 22 can then be attached to reel spool 16 and the latter loaded by operation of reel 14 in the conventional manner. The spool holder 22 maintains a sufficiently constant tension on line 18 as it is paying out onto reel spool 16 so that tangling, twisting and the other aforementioned problems are avoided.

As an added feature, the spool holder 22 may also serve as a prop for rod 10 as shown in FIG. 4. In FIG. 4, the portion of arms 40 and 42 extending beyond guide 54 are in the completely sprung state. Sufficient flaring results to provide a reasonably stable stand for the rod.

The dimensions of the various sections of holder 22 may be standard for a wide variety of rods. The approximate dimensions of a typical holder 24 are as follows: music wire having a diameter of 0.055 inches; junction member, 2 cm.; segments 36 and 38, 3.7; angles 42, about 90°; segments 50 and 52, 5.7 cm.; angles formed by segments 50, 57 and 52, 58, 150°; segments 57 and 58, 3 cm.; angles formed by segments 57, 68 and 58, 70, 150°; segments 68, 70, 8 cm.; and feet 74 and 76, 0.4 cm.

FIG. 5 illustrates a second embodiment of the invention. Attachment to rod 10 is provided by a clip 78 having opposing curved members 80 and 82 which provide a cylindrical space therebetween. Clip 78 includes a bias spring 83 which urges curved members 80 and 82 toward each other. Extending longitudinally along the lower edges of curved members 80 and 82 are flange sections 84 and 86, each of which have inwardly directed terminal sections 88 and 90. Flange sections 84 and 86, together with terminal sections 88 and 90 aid in providing a firm grip on rod 10. Extending from curved members 80 and 82 are tabs 91 and 92 having apertures 94 and 96. Spring wire 98 passes apertures 94 and 96. Spring wire 98 includes a junction section 100 from opposing ends of which extend arms 102 and 104.

Points 106 and 108 are midpoints of a curved segment 110 and 112, respectively. From points 114 and 116, arms 102 and 104 extend to points 118 and 120. Extending at an outwardly directed angle from points 118 and 120 are feet 122 and 124, respectively. Spool 22 is situated on the embodiment of FIG. 5 along the segments 126 and 128. The embodiment of FIG. 5 may be readily attached to rod 10 by pinching tabs 91 and 92 together to compress spring 83, thereby opening curved members 80 and 82 to allow them to fit over rod 10 as shown. The embodiment of FIG. 5 may be employed as a rod stand in the same fashion as the embodiment of FIGS. 1 and 4.

It is to be understood that many changes may be made in this invention without departing from the spirit and scope thereof. While the invention has been depicted in conjunction with an open-faced reel, the invention is also suitable for close-faced reels as well. In FIG. 1, the reel is shown above the rod for illustrative purposes. In practice, as is well known, the rod is held so that the reel is beneath the rod during a reeling operation.

I claim:

1. A device for holding an apertured spool of line on a rod to reel the line from the spool onto a reel positioned on the rod, said device comprising in combination:
   a. rod attaching means for releasably attaching said device to the rod, said attaching means comprising:
      i. a clip including a first member having an elongated face and a second member having an elongated face, said elongated faces being in opposed relationship and defining an elongated space therebetween of a shape conforming to the shape of the rod; and
      ii. biasing means urging said first and second members toward one another with a force of a magnitude sufficient to hold said clip in a relatively fixed position on the rod during winding of the line on the reel from the spool; and
   b. first and second arms connected to said attaching means for supporting the spool, said first and seconds arms each having a spring tension urging said first and second arms in opposing directions and of a magnitude sufficient to be overcome manually to bring said first and second arms into close spaced relationship to pass through the aperture of the spool whereupon manual release of said first and second arms separates said first and second arms and the spring tension exerts a holding force on the spool sufficient to allow line to be withdrawn under tension from the spool onto the reel.

2. A device for holding an apertured spool of line on a rod to reel the line from the spool onto a reel positioned on the rod, said device comprising in combination:
   a. first and second arms for supporting the spool, said first and second arms each having a spring tension urging said first and second arms in opposing directions and of a magnitude sufficient to be overcome manually to bring said first and second arms into close spaced relationship to pass through the aperture of the spool whereupon manual release of said first and second arms separates said first and second arms and the spring tension exerts a holding force on the spool sufficient to allow line to be withdrawn under tension from the spool onto the reel; and b. rod attaching means for releasably attaching said device to the rod, said attaching means comprising:
  i. a junction section developed at the extremity of extensions of said first and second arms for maintaining said first and second arms laterally spaced apart from one another;
  ii. an angle section disposed intermediate said junction section and said first and second arms, said angle section including a bend having apices directed away from said first and second arms; whereby, said angle section in combination with said junction section define a holding space for receiving the rod intermediate the extensions of said first and second arms and transverse to said junction section;

whereby, said first and second arms support the spool and said rod attaching means support said first and second arms upon the rod.

3. The device as set forth in claim 2 wherein said first and second arms extend from said angle section in spaced relationship to form a rod guide engaging section insertable through a rod guide.

4. The device as set forth in claim 2 wherein the bend of said angle section is less than 180°.

5. The device as set forth in claim 4 wherein the junction between said rod guide engaging section and said angle section defines a further bend.

6. The device as set forth in claim 2 further comprising holding means for spanning at least the apices of the bend of said angle section, said holding means being adapted to bear against the rod located in the holding place to secure said device to the rod.

7. The device as set forth in claim 6 wherein said holding means comprises a pin member insertable between the apices and the rod.

* * * * *